United States Patent Office 3,501,430
Patented Mar. 17, 1970

3,501,430
VINYL CHLORIDE RESINS STABILIZED WITH COMBINATIONS OF A ZINC SALT AND A POLYPHOSPHITE
Lewis B. Weisfeld, Highland Park, N.J., assignor to Carlisle Chemical Works, Inc., Reading, Ohio
No Drawing. Filed Nov. 10, 1966, Ser. No. 593,283
Int. Cl. C08f 45/62
U.S. Cl. 260—23    3 Claims

ABSTRACT OF THE DISCLOSURE

The reaction product of a poly(alkylene oxy) glycol with a tri hydrocarbyl phosphite having a molecular weight in excess of 1500 is useful to improve the long term heat stabilizing of halogen-containing resins having an organic zinc salt stabilizer.

This invention relates to stabilized halogen-containing resins in which the stabilizer system contains zinc and organic phosphites.

Organic phosphites have been widely used as auxiliary stabilizers in combination with metal salts of fatty acids. In Patent No. 3,082,189, polyhydric alcohol phosphites were for the first time disclosed as having particular advantages over the conventional trialkyl and triaryl phosphite stabilizers. According to Patent No. 3,210,319, such polyhydric alcohol phosphites are used in combination with lower alkylene oxides. In said latter patent, said phosphites are called "polymeric organophosphites," and, for the sake of brevity, said term will be used hereinafter to designate phosphorus acid esters of polyols.

Patent No. 3,262,896 discloses and claims for halo-ethylene polymers stabilizing systems which comprise zinc and potassium salts of aliphatic fatty acids having 6 to 12 carbon atoms, branched aliphatic acids having 5 to 12 carbon atoms, benzoic acid, and substituted benzoic acids, in combination with organic phosphites. In such stabilizer systems the potassium delays the appearance of the well-known "zinc-burning" effect. This effect consists in a sudden blackening of the resin in the presence of zinc, which otherwise would be an almost ideal stabilizer in many resin formulations, because it does not form dark-colored sulfides in the presence of sulfur and because zinc stabilizers allow of using the resin for food packaging and similar application. It may be said that, with respect to polyvinyl chloride and similar halogen-containing resins, zinc salts have an ambivalent effect. They act as stabilizers and also as decomposition catalysts, and it has been a long-standing problem to find a way to benefit of their stabilizing properties while suppressing or delaying their degradation effect.

Though the compositions disclosed in Patent No. 3,262,896 provide a certain solution to that problem, this solution is not yet quite satisfactory because it requires the presence of relatively large amounts of potassium salts which sometimes may be undesirable.

I have found that certain polymeric organo phosphites by themselves counteract the "burning" effect of zinc so as to allow of using zinc salt stabilizers in resins which during or after processing, are subject to elevated temperatures, without the simultaneous use of potassium salts or with smaller amounts of such salts. Accordingly, such polymeric organo phosphites may completely replace the potassium salts of U.S. 3,262,896, or be used in combination therewith, to improve the long-term heat stability of halogen-containing resins, particularly vinyl chloride resins, which contain an organic zinc salt as stabilizer.

Any organic zinc salt known to be suitable as stabilizer can be used. Such zinc salts are generally salts of monocarboxylic aliphatic acids having 6 to 18 carbon atoms, also of dicarboxylic acids or dicarboxylic acid monoesters, benzoic acid, or substituted benzoic acids. I have found zinc salts of neo-acids having 5 to 12 carbon atoms particularly suitable.

My investigations have shown that the recited favorable effect of the polymeric organo phosphites is a function of their molecular weight, and that the effect is sufficient for practical purposes only with such phosphites which have a molecular weight in excess of 1500. Said phosphites are prepared by equilibrating, in the presence of a basic catalyst, the correct stoichiometric amount of the polyol with a trihydrocarbyl phosphite, and distilling off the liberated alcohol or phenol. Generally, triphenyl phosphite or tris (nonyl phenyl) phosphite are used for this purpose. At present, such high molecular weight phosphites available in commerce are particularly phosphorous acid esters of poly(alkyleneoxy)glycols, e.g. polyethylene and polypropylene glycol. Examples, of such compounds are tetraphenyl polypropyleneoxyglycol diphosphite, tetrakis (nonylphenyl) polypropyleneoxyglycol diphosphite, heptakis nonylphenyl tetrakis polypropylenoxyglycol triphosphite, and similar compounds, provided that the polyalkyleneoxy chain is long enough to satisfy the molecular weight condition defined hereinabove. The recited compounds may be represented by the formulae Tetraphenyl-polypropyleneglycol (MW 1025)-diphosphite

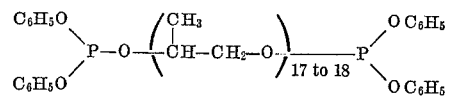

Tetrakis (nonylphenyl)-polypropyleneglycol (MW 1025)-diphosphite

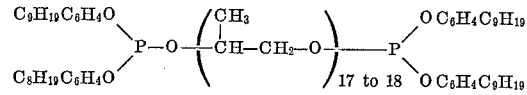

Heptakis (nonylphenyl) tetrakis-polypropyleneglycol (MW 425)-pentaphosphite

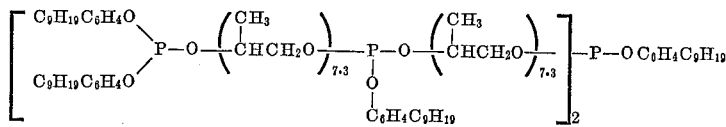

In viewing said formulae, it must be taken into account that they are idealized since also head-to-head polymerization does occur to an appreciable degree, producing terminal secondary hydroxyl groups.

The zinc salts are used in amounts of 0.01 to 3 percent of Zn by weight of the stabilized resin composition, and the phosphites in amounts of 0.1 to 5 percent. Other conventional stabilizers and additives may be present.

The Zn-P stabilizer combination of the invention is of particular importance for vinyl chloride and vinylidene chloride polymers and copolymers which contain vinyl chloride or vinylidene chloride in amounts from 50 to 100 percent of the polymer. However, the stabilizer can be also employed for all the other halogen-containing polymers and copolymers recited in the patent referred to hereinabove.

The invention is illustrated by the following examples where the effect of various organic phosphites on the darkening of zinc stabilized vinyl chloride resins is tabulated.

Examples 1–10

The tests were made with a base formulation consisting of

|  | Phr. |
|---|---|
| Polyvinyl chloride (Geon 103–EP) | 100 |
| Dioctylphthalate | 47 |
| Epoxidized soybean oil | 3 |
| Zinc stearate | 0.5 |

Samples of this formulation were compounded with various phosphites on an equivalent phosphorus basis containing 0.0225 phr. of phosphorus. The blends were kept in an air circulating oven at 365° F. and a sample was removed every 5 minutes to observe the color.

The following phosphites were used:

(1) None (control)
(2) Phenyl didecyl phosphite
(3) Tetraphenyl-(PPG–1025)-diphosphite
(4) Tetrakis (nonylphenyl)-(PPG–1025)-diphosphite
(5) Tetrakis (nonylphenyl)-triethyleneglycol diphosphite
(6) Tetraphenyl triethylene glycol diphosphite
(7) Decaphenyl heptakis (tripropylene glycol) octaphosphite
(8) Decakis (nonylphenyl) heptakis (tripropylene glycol octaphosphite)
(9) Heptakis (nonylphenyl) tetrakis-(PPG–425)-diphosphite
(10) Decaphenyl heptakis (triethylene glycol) octaphosphite In the above designations, PPG–1025 and PPG–425 are polypropylene glycols of about 1025 and 425 molecular weights, respectively.

TABLE I

| Phosphite: | Percent P | Phr. | M.W. | Minutes to darkening |
|---|---|---|---|---|
| 1 | | | | 20 |
| 2 | 7.5 | 0.30 | 439 | 25 |
| 3 | 4.36 | 0.52 | 1,441 | 30 |
| 4 | 3.23 | 0.70 | 1,950 | 35 |
| 5 | 5.75 | 0.39 | 1,086 | 25 |
| 6 | 10.68 | 0.21 | 566 | 25 |
| 7 | 9.68 | 0.23 | 2,399 | 35 |
| 8 | 6.57 | 0.34 | 3,671 | 35 |
| 9 | 4.5 | 0.50 | 3,325 | 35 |
| 10 | 9.7 | 0.23 | 2,104 | 35 |

Examples 11–16

For these examples, a more zinc sensitive polyvinyl chloride resin was employed, namely Borden VC–105 PM, a dispersion type homopolymer. The basic formulation consisted of

|  | Parts |
|---|---|
| PVC homopolymer | 100.0 |
| Dioctyl phthalate | 45.0 |
| Epoxidized soya oil | 5.0 |
| 2,6-ditertiarybutyl-p-cresol | 0.1 |
| Zinc laurate | 0.161 |
| Stearic acid | 0.5 |
| Stabilizer | As indicated |

The formulations were milled on a two roll mill at 350° F. for five minutes, then samples were placed in a circulating air oven at 350° F. with specimens removed every five minutes. The results were as follows:

| | Stabilizer | Phr. | M.W. | Minutes to black |
|---|---|---|---|---|
| 11 | None | | | 45 |
| 12 | Triphenyl phosphite | 0.5 | | 45 |
| 13 | Tris(nonyl phenyl phosphite) | 1.11 | | 80 |
| 14 | Triphenyl phosphite / Potassium laurate | 0.5 / 0.031 | | 55 |
| 15 | Heptakis (nonyl phenyl) tetrakis-(PPG–425)-diphosphite | 1.09 | | 120 |
| 16 | Heptakis (nonyl phenyl) tetrakis-(PPG–425)-diphosphite / Potassium laurate | 1.09 / 0.031 | | Over 120 |

The examples show that the high molecular weight phosphites alone are more effective than the conventional low molecular weight organic phosphites together with potassium salts.

It must be further understood that the stabilization times are different for every resin system, depending on the zinc sensitivity of the resin and the amount of zinc stabilizer present. Therefore, the results of Examples 1–10 on the one hand, and those of Examples 11–16, on the other hand, cannot be compared. However, the examples show that in every individual system, how different the zinc sensitivity may be, the time to catastrophic degradation catalyzer by the presence of zinc can be substantially extended by the addition of the high molecular weight polymeric organo phosphites of the invention.

I claim:

1. A heat resistant plastic composition including as a major constituent a haloethylene polymer and containing as stabilizers about 0.01 to 3 weight percent zinc as a zinc salt of a carboxylic acid and about 0.1 to 5 weight percent of an organic phosphite which is the reaction product of a poly (alkyleneoxy) glycol with a trihydrocarbyl phosphite and has a molecular weight in excess of 1500.

2. A heat resistant plastic composition as claimed in claim 1 wherein said haloethylene polymer is a polyvinyl chloride resin.

3. A heat resistant plastic composition as claimed in claim 2 wherein said polyvinyl chloride resin is a vinyl chloride homopolymer.

References Cited

UNITED STATES PATENTS

| 3,047,608 | 7/1962 | Friedman et al. | 260—929 |
| 3,082,189 | 3/1963 | Mack et al. | 260—45.95 |
| 3,133,043 | 5/1964 | Rosenfelder et al. | 260—45.8 |
| 3,245,926 | 4/1966 | Parker | 260—23 |
| 3,262,896 | 7/1966 | Ackerman | 260—23 |
| 3,375,304 | 3/1968 | Larrison | 260—929 |

DONALD E. CZAJA, Primary Examiner

R. A. WHITE, Assistant Examiner

U.S. Cl. X.R.

260—45.7, 45.75, 45.8